United States Patent [19]
Egeland

[11] 3,775,680
[45] Nov. 27, 1973

[54] DEVICE FOR THE DETECTION OF WEAR

[75] Inventor: Olav Egeland, Oslo, Norway

[73] Assignee: A/S Computas, Oslo, Norway

[22] Filed: Feb. 18, 1972

[21] Appl. No.: 227,599

[30] Foreign Application Priority Data
Feb. 22, 1971 Norway.................................. 628/71

[52] U.S. Cl...................... 324/65 P, 73/7, 340/269
[51] Int. Cl............................................ G01r 27/02
[58] Field of Search....................... 324/65 R, 65 P; 340/269; 73/7

[56] References Cited
UNITED STATES PATENTS
2,981,929 4/1961 Rizzo et al...................... 340/269 X
3,102,759 9/1963 Stewart......................... 340/269 UX
3,452,349 6/1969 Wood................................. 340/269

Primary Examiner—Stanley T. Krawczewicz
Attorney—S. Delvalle Goldsmith et al.

[57] ABSTRACT

Device for the detection of wear on the surface of a machine element, characterized thereby that in the material of the machine element there is provided a detector element in the form of an electrical resistor the current carrying cross-section of which is adapted to be reduced along with the wearing-down of the surface of the machine element.

3 Claims, 5 Drawing Figures

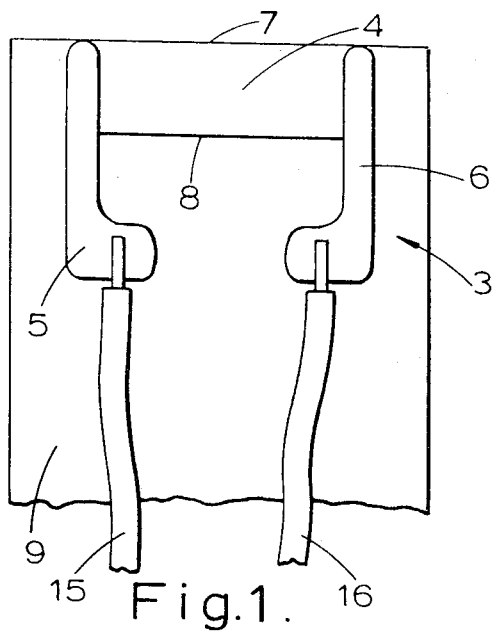
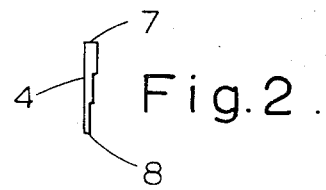
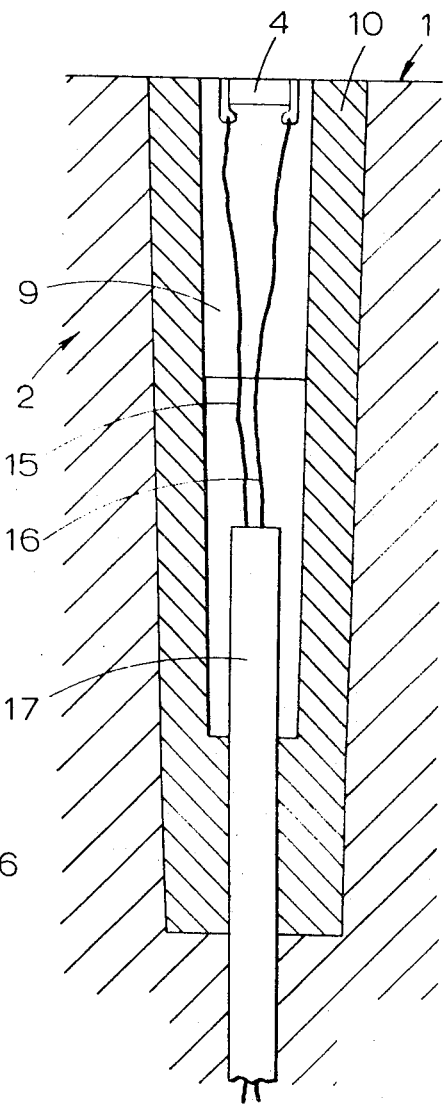
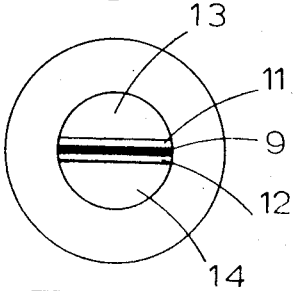
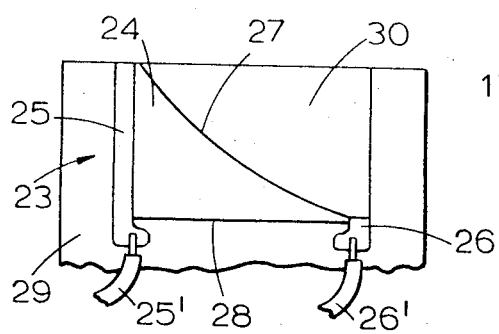

DEVICE FOR THE DETECTION OF WEAR

This invention relates to a device for the detection of wear on the surface of machine elements. In various machine structures with relatively moving parts it is of interest to be able to detect or measure how surfaces are worn, in particular abnormal wear conditions so that automatic checking or alarm can be effected, in order that for instance detrimental wear and possible breakdown can be avoided. Further, it may be of interest to make a diagnosis of the wear, which is of assistance for determining time intervals for overhaul or replacement, for instance of bearings or liners, as for instance in ship machinery.

Watching of the wear of bearings and the like is usually carried out by direct quantity or dimension measurements or by detecting secondary phenomena such as noise level, temperatures, the concentration of metal particles in lubricant or exterior deflections. These known methods are subject to several deficiencies and shortcomings, mainly that the phenomena being employed are not unambiguous functions of the wear of bearings and that the degree of precision and reliability are poor.

From U.S. Pat. No. 3,078,707 there is known a principle of measuring the thickness of refractory linings in blast furnaces, based on electrical resistors connected with mutual spacing between two conductors which from the furnace shell extend through the essentially electrically insulating refractory lining towards the inner surface thereof. When by and by the lining is abraded or torn away, one by one of the resistors will be destructed and a corresponding change in the resulting resistance between the two conductors being extended out from the furnace wall, can be measured. This known arrangement, however, is completely unsuited for use in machine elements, mainly because these have a wear which is of quite different order of magnitude from what is found in blast furnace linings.

That which is new and specific in the device according to the invention for the solution of the task discussed above, primarily consists therein that in the material of the machine element there is provided a detector element in the form of an electrical resistor the current carrying cross-section of which is adapted to be reduced along with the wear-down of the surface of the machine element.

Thus, the detector or resistor element is normally adapted to extend through the body or wall of the machine element to the wearing surface thereof. The face of the detector is being worn down together with the surface of the machine element and the decreasing current carrying cross-section thereby will lead to an increased resistance value of the resistor.

Thus, by means of this solution it will be possible to continuously monitor the amount of wear on machine components or elements being subject to wear. Examples of machine elements of interest which can be watched in this way are cylinder liners in piston machines and liners in plain bearings.

In the following the invention as well as additional advantages and specific features thereof shall be described more in detail with reference to the drawing in which:

FIG. 1 shows an electric resistance element in a device according to the invention, FIG. 2 shows a cross-section of the resistance element itself in a particular embodiment thereof, FIG. 3 shows a longitudinal section of a device according to the invention mounted in a machine element, FIG. 4 shows the device in FIG. 3 seen from above, and FIG. 5 shows a further embodiment of the resistance element according to the invention.

In FIG. 1 there is shown the detector element 3 consisting of a coating 4 of resistance material provided on a supporting plate 9 and provided with leads 5 and 6 each at an opposite side of the resistor 4. The resistor has generally a rectangular extension and the remaining two sides 7 and 8, respectively, are consequently parallel, the upper side 7 being flush with the end of the supporting plate 9.

FIG. 3 shows a section of the detector element described in connection with FIG. 1, mounted in a complete device according to the invention, consisting of a conical plug inserted in a correspondingly shaped bore in a machine element 2 from that surface 1 thereof the wear of which is to be measured. The supporting plate 9 with the electrical resistor 4 and the electric connection brought about by means of wires 15 and 16 connected to widened connecting areas of the respective leads 5 and 6 as shown in FIG. 1, is adapted to and secured in the cavity in the plug 10 by means of wedges 13 and 14 as shown in FIG. 4. In FIG. 4 there is further shown how on both sides of the supporting plate 9 there can be provided insulation sheets or layers 11 and 12, respectively, so as to insulate the resistor 4 with leads 5 and 6 from the wedges 13 and 14, respectively, which usually will be made of a metal, i.e. an electrically conductive material.

As shown in FIG. 3, the wires 15 and 16 can in practice extend through a tube 17 out of the sleeve or plug 10 and further through the body of the machine element 2 to suitable electrical circuits for measuring the resistance value of the resistance element 4.

With the arrangement as described, it will be possible to detect or measure the wear of the surface 1 since the resistance element 4 with one longitudinal side 7 is exposed at the surface 1 being subjected to wear, whereby the current carrying cross-section of the resistance element 4 will be reduced along with the wearing-down of the surface 1.

With certain forms of wear and types of material or structure in the machine element 1, it is of importance that the insulation 11 and 12 is so thick that there cannot be formed conductive bridges or connections between the wedges 13 or 14 and the exposed edge 7 of the resistance element 4. This could lead to undesired parallel current paths which represent sources of error in the measurement.

It will further be practical to make both the plug 10 as well as the wedges 13 and 14 of a material having somewhat corresponding wearing properties as the material in the machine element 2. The resistance increase which will result because of the wearing-down of the side edge 7 and thereby the current carrying cross-section of the resistor 4, can be recorded by means of a measuring instrument, a measuring bridge or the like, so that a measure of the wear is obtained. The time derivative of the resistance increase will be a measure of the intensity of wear on the surface 1 of the machine element 2.

As shown in FIG. 2 the cross-section of the resistance element 4 can be varied from the exposed side edge 7 to the other longitudinal side 8, whereby the characteristic of the resistance element as a function of the depth of wear can be influenced as desired. The cross-section variation can be step-wise with for instance three steps as shown in FIG. 2, or it can be continuous. With a decreasing thickness of the cross-section from the side edge 7 to the side edge 8 it will be possible to a certain extent to compensate for the increasing relative resistance change with increasing wearing depth of the detector element.

In the embodiment shown in FIG. 5 an advantageous resistance variation as a function of the wear is obtained in a different way, i.e., by instead of cross-section variation of the resistance element, to use a resistance element which has a varying effective length. As in the embodiment of FIG. 1, the embodiment of FIG. 5 has a coating 24 of resistance material provided on a supporting plate 29 and leads 25 and 26 at opposite ends of the resistance element 24. This element, however, is here not generally rectangular, but mainly more or less triangular, i.e., in addition to substantially rectilinear boundaries along the lead 25 and at the lower edge 28 of the element, this has a boundary line 27 following some curve at an inclination downwardly from the top of the element to the bottom thereof. Along this line or curve the element 24 is bounded by an extended conductor portion 30 being substantially more conductive than the coating which forms the resistance element 24 and being directly connected to the lead 26. With such a shape of the resistance element it will in an advantageous way be possible to adapt the resistance characteristic as desired. In particular it can be an advantage to adapt or adjust the curve 27 in such a way that the relative resistance variation with a given small wear is substantially constant over the whole measuring range of interest. Another practical consideration is that it can be desirable to obtain an output signal having a linear or an exponential relationship to the depth of wearing, which it is possible to obtain with a suitable shape of the boundary line or edge 27.

A detector element with resistor 4 and leads 5 and 6 as discussed above, can in practice with advantage be made by thin film techniques, in which the supporting plate 9 can be the insulating substrate on which the resistance coating for forming the resistor 4 is applied, for instance by so-called cathode sputtering, and in which the leads 5 and 6 are applied on beforehand or afterwards in the form of for instance a gold coating.

If the total range of wearing depth to be covered, is large or the requirements as to the resolution of the measurement makes it necessary, there can of course be provided several resistors 4 with corresponding leads 5 and 6 in such a way that the resistance elements are lying with different spacing from the surface 1 of the machine element, whereby they enter into function in succession as the wearing-down proceeds. With such an arrangement leads and connecting wires, respectively can be common at abutting ends of adjacent elements.

What is claimed is:

1. Device for the continuous measurement of wear on the surface (1) of a machine element (2), comprising a detector element (3) arranged in the material of the machine element (2), said detector element being in the form of an electrical thin film resistor (4) having two opposite sides being non-parallel to said machine element surface, said detector element further comprising thin film leads (5,6) providing contact along said two opposite sides of the thin film resistor for connecting the resistor to associated electrical measuring circuits, and one edge of said resistor other than said two opposite sides thereof being adapted to be exposed at said machine element surface, whereby the current carrying cross-section of said thin film resistor is adapted to be reduced along with the wearing down of said machine element surface (1).

2. Device according to claim 1, characterized thereby that the electrical resistor (24) has essentially a plate shape and has at least one boundary edge (27) which from the wearing edge of the detector element (23) runs inwardly thereon at an inclination, possibly with a continuously varying direction, so that there is obtained a preferably continuously increasing effective length of the resistor with increased wear.

3. Device according to claim 1, characterized thereby that the detector element (3) is provided on a supporting plate (9) with electrical insulation on both sides of the electrical resistor (4), that the whole assembly is mounted in a preferably conical hollow plug (10) by means of wedges, and that the plug and the wedges are made of a material with approximately the same wearing properties as the material in the machine element (2).

* * * * *